United States Patent
Yanai

(10) Patent No.: US 10,218,091 B2
(45) Date of Patent: Feb. 26, 2019

(54) PROTECTOR AND WIRE HARNESS

(71) Applicant: Sumitomo Wiring Systems, Ltd., Yokkaichi, Mie (JP)

(72) Inventor: Shinji Yanai, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/800,460

(22) Filed: Nov. 1, 2017

(65) Prior Publication Data
US 2018/0145430 A1  May 24, 2018

(30) Foreign Application Priority Data
Nov. 18, 2016 (JP) ................. 2016-224766

(51) Int. Cl.
| | |
|---|---|
| *H01R 4/70* | (2006.01) |
| *H01B 7/02* | (2006.01) |
| *B60R 16/02* | (2006.01) |
| *H01R 4/02* | (2006.01) |
| *H01R 43/02* | (2006.01) |

(52) U.S. Cl.
CPC .......... *H01R 4/70* (2013.01); *B60R 16/0215* (2013.01); *H01B 7/02* (2013.01); *H01R 4/029* (2013.01); *H01R 43/0207* (2013.01); *H01R 4/021* (2013.01)

(58) Field of Classification Search
CPC ...... H01R 4/70; H01R 4/029; H01R 43/0207; B60R 16/0215; H01B 7/02
USPC ...................................... 174/72 A
See application file for complete search history.

(56) References Cited

U.S. PATENT DOCUMENTS

| | | | | |
|---|---|---|---|---|
| 5,672,846 A * | 9/1997 | Marie-Louise | ........ | H01B 17/60 174/76 |
| 5,724,730 A * | 3/1998 | Tanaka | ............. | B29C 45/14639 174/76 |
| 6,376,773 B1 * | 4/2002 | Maegawa | ............. | H01R 12/63 174/117 F |
| 6,658,735 B2 * | 12/2003 | Ito | ........... | H01R 4/183 174/84 C |
| 8,931,685 B2 * | 1/2015 | Kataoka | ................. | H01R 4/021 228/110.1 |

(Continued)

FOREIGN PATENT DOCUMENTS

| JP | 2011-125086 | * | 6/2011 |
|---|---|---|---|
| JP | 2016058137 A | | 4/2016 |

*Primary Examiner* — Michael F McAllister
(74) *Attorney, Agent, or Firm* — Reising Ethington, P.C.

(57) ABSTRACT

A protector mounted on a connecting portion in which a conductor is exposed at a terminal portion of a first wire by stripping insulating coating therefrom is placed on and connected to a conductor exposed at a terminal portion of a second wire by stripping insulating coating therefrom in a direction transverse to the direction in which the first wire and the second wire extend, the second wire having a higher flexibility than the first wire. The protector includes: a main body that extends between the insulating coating of the first wire and the insulating coating of the second wire; an abutment portion that comes into abutment with at least both sides of the insulating coating of the second wire in the direction in which the conductor of the first wire and the conductor of the second wire are placed on each other.

3 Claims, 4 Drawing Sheets

(56) References Cited

U.S. PATENT DOCUMENTS

| | | | |
|---|---|---|---|
| 8,936,187 B2* | 1/2015 | Hino | H01R 43/02 |
| | | | 228/112.1 |
| 9,882,292 B2* | 1/2018 | Koto | H01R 4/625 |
| 2006/0121773 A1* | 6/2006 | Ichikawa | H01R 4/70 |
| | | | 439/408 |
| 2010/0175906 A1* | 7/2010 | Takayama | H01R 4/20 |
| | | | 174/59 |
| 2016/0071630 A1 | 3/2016 | Sugino | |

* cited by examiner

PROTECTOR AND WIRE HARNESS

CROSS REFERENCE TO RELATED APPLICATIONS

This application claims the priority of Japanese patent application JP2016-224766 filed on Nov. 18, 2016, the entire contents of which are incorporated herein.

TECHNICAL FIELD

The present invention relates to a protector attached to a connection portion between electric wires and a wire harness in which the protector is employed.

TECHNICAL BACKGROUND

Wire harnesses mounted on board of vehicles, such as hybrid cars and electric cars, have been conventionally known in which electric wires having different flexibilities, such as single-core wires and stranded wires, are connected to one another. For example, JP 2016-58137A describes a wire harness in which single-core wires are connected to stranded wires such that, when mounted in a vehicle, the single-core wires are used in the locations where no flexibility is required and the stranded wires are used in the locations where flexibility is required for connection with pieces of equipment. The conductor exposed at a terminal portion of each single-core wire by stripping the insulating coating therefrom is placed on the conductor exposed at a terminal portion of a stranded wire by stripping the insulating coating therefrom in longitudinal and transverse directions of both wires, and the single-core wire and the stranded wire are connected by ultrasonic welding.

JP 2016-58137A is an example of related art.

SUMMARY

However, while the above-described connection portion connecting the electric wires may be robust against forces exerted in the direction in which the wires extend, it tends to be vulnerable to forces transversal to the direction in which the wires extend (i.e., "peeling forces"). Moreover, electric wires with a high flexibility are susceptible to deflection, which may in turn exert a peeling force on the connection. Preventive measures against electric wire deflection have been desired as peeling may occur at the connection if peeling force is applied to the connection.

The present design has been made in the light of the above-described circumstances and its object is to provide a protector capable of protecting a connection between electric wires and a wire harness in which the protector is employed.

The present application provides a protector to be mounted on a connecting portion in which a conductor exposed at a terminal portion of a first wire by stripping insulating coating therefrom is placed on and connected to a conductor exposed at a terminal portion of a second wire by stripping insulating coating therefrom in a direction transverse to the direction in which the first wire and the second wire extend, the second wire having a higher flexibility than the first wire. The protector comprises: a main body extending between the insulating coating of the first wire and the insulating coating of the second wire; and an abutment portion that comes into abutment with at least both sides of the insulating coating of the second wire in the direction in which the conductor of the first wire and the conductor of the second wire are placed on each other.

The present application is also directed to a wire harness that comprises: a first wire; a second wire having a higher flexibility than the first wire; a connecting portion in which a conductor exposed at a terminal portion of a first wire by stripping insulating coating therefrom is placed on and connected to a conductor exposed at a terminal portion of a second wire by stripping insulating coating therefrom in a direction transverse to the direction in which the first wire and the second wire extend; and the protector being mounted on the connecting portion.

According to the present application, even if the second wire, which has a relatively high flexibility, is deflected, the connecting portion can be protected as the abutment portion can prevent deflection in the direction that may otherwise peel the conductor of the second wire from the conductor of the first wire.

EMBODIMENTS

Figure 1:
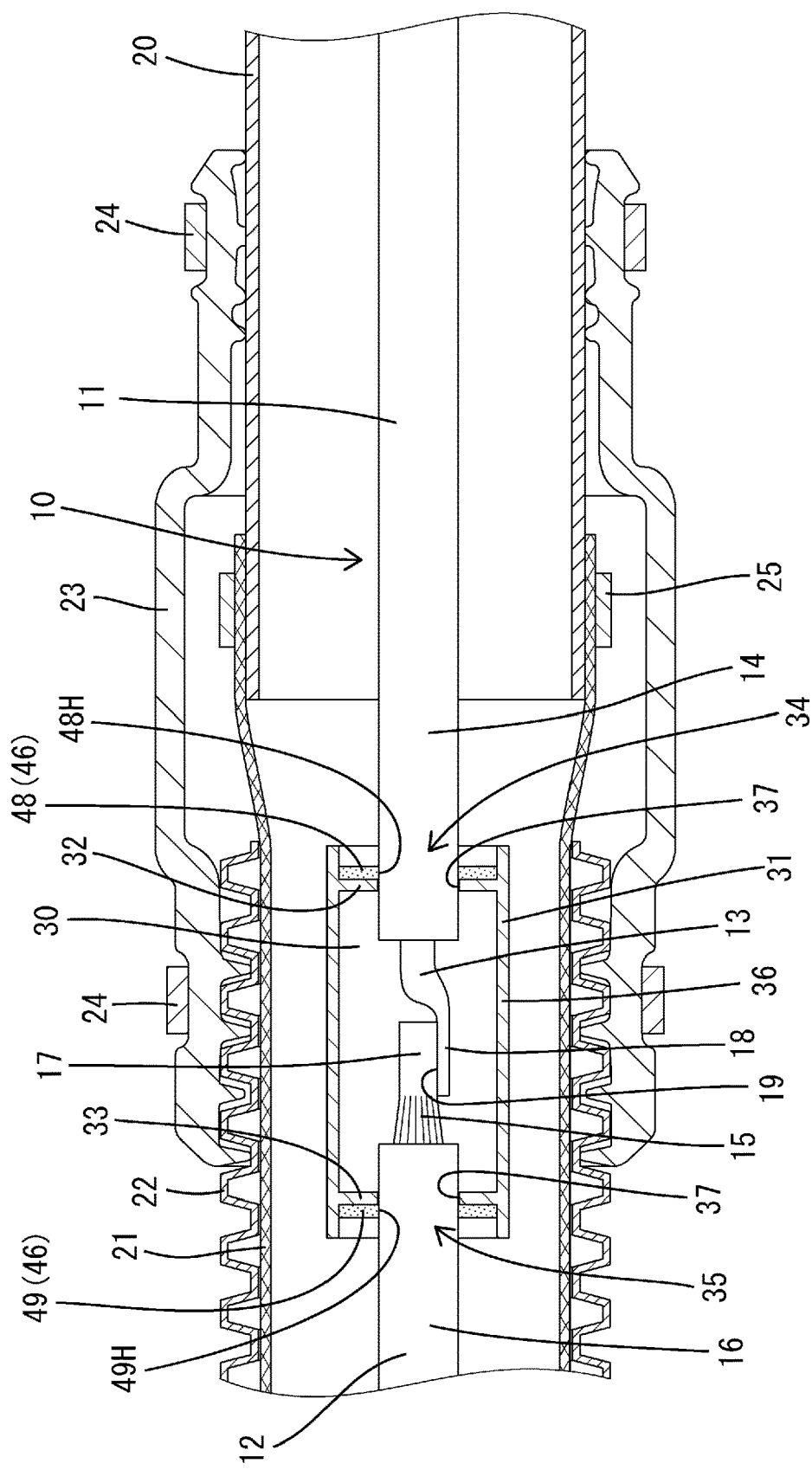
FIG. 1 is a cross-sectional view of the wire harness of Embodiment 1, enlarging the vicinity of the connection portion between a first wire and a second wire.

Preferred embodiments will be described hereinafter.

In one aspect of the protector of the present application, the main body includes a pair of split bodies that can be joined together. The split bodies, when joined together, cover an entire portion extending between the insulating coating of the first wire and the insulating coating of the second wire. The split bodies include a sealing structure that, when the split bodies are joined together, provides sealing: between parting faces of the split bodies that come into abutment with each other; between the circumferential surface of a first insertion hole through which the first wire is drawn out of the main body and the outer circumferential surface of the first wire; and between the circumferential surface of a second insertion hole through which the second wire is drawn out of the main body and the outer circumferential surface of the second wire.

According to the structure, as the interior of the main body is sealed in a fluid-tight manner, the connecting portion between the first wire and the second wire can be advantageously sealed against water.

Embodiment

One embodiment of the present application will be described in detail hereinafter with reference to FIGS. 1 to 4.

The wire harness according to this embodiment is mounted on board of vehicles, such as hybrid cars, by being connected between pieces of equipment installed in the front of the vehicle and pieces of equipment installed in the rear of the vehicle. The wire harness of this embodiment includes a plurality (two in this embodiment) of conductive wires 10.

These conductive wires 10 are passed through a shield pipe 20 mounted on the underside of the floor of the vehicle. Most of the shield pipe 20 extends longitudinally along the underside of the vehicle floor with the front and rear ends of the shield pipe 20 disposed in the cabin. The shield pipe 20 is an elongated piece of a piping material made of metal (for example, aluminum or aluminum alloy). The shield pipe 20 has a circular cross section and is bent to conform to the predetermined piping route.

A braided member 21 is connected to each of the front and rear ends of the shield pipe 20 so that the entire length of the conductive wires 10 are shielded from noise by being surrounded by the shield pipe 20 or the braided members 21. Each braided member 21 is made of conductive metal elemental wires braided into a tube and has an excellent flexibility. The braided member 21 is crimped to one end of the shield pipe 20 with a crimping ring 25.

The braided member 21 is surrounded and protected by an outer jacket 22 that has an excellent flexibility. The outer jacket 22 can be formed, for example, from a corrugated tube made of a synthetic resin.

Mounted on the wire harness is a grommet 23 that spans the outer jacket 22 and the shield pipe 20. The grommet 23 is made of a rubber material formed into a tube with one end thereof in intimate contact with the shield pipe 20 and the other end thereof also in intimate contact with the outer jacket 22. The grommet 23 is secured to the shield pipe 20 and the outer jacket 22 by tightening fastener members 24, such as tie bands, on the grommet 23.

The conductive wire 10 includes a first wire 11 and a second wire 12 having a higher flexibility than, and connected to, the first wire 11 in the longitudinal direction thereof.

The first wire 11 is a single-core wire made of a single metal-rod (core) conductor (hereinafter referred to as the first conductor 13) surrounded with an insulating coating 14. The first conductor 13 is made of aluminum or aluminum alloy formed to have a circular cross section.

The second wire 12 is a stranded wire that comprises a conductor made of a plurality of stranded elemental metal wires (hereinafter referred to as the second conductor 15) surrounded with an insulating coating 16. The second conductor 15 is made of aluminum or aluminum alloy. The second wire 12 has an outer diameter that is greater than that of the first wire 11.

The conductive wire 10 has a connecting portion 17 in which the first conductor 13 exposed at a terminal portion of the first wire 11 by stripping the insulating coating 14 therefrom is placed on and connected to the second conductor 15 exposed at a terminal portion of the second wire 12 by stripping the insulating coating 16 therefrom, in a direction transverse to the direction in which the first and second wires 11 and 12 extend.

Figure 3:
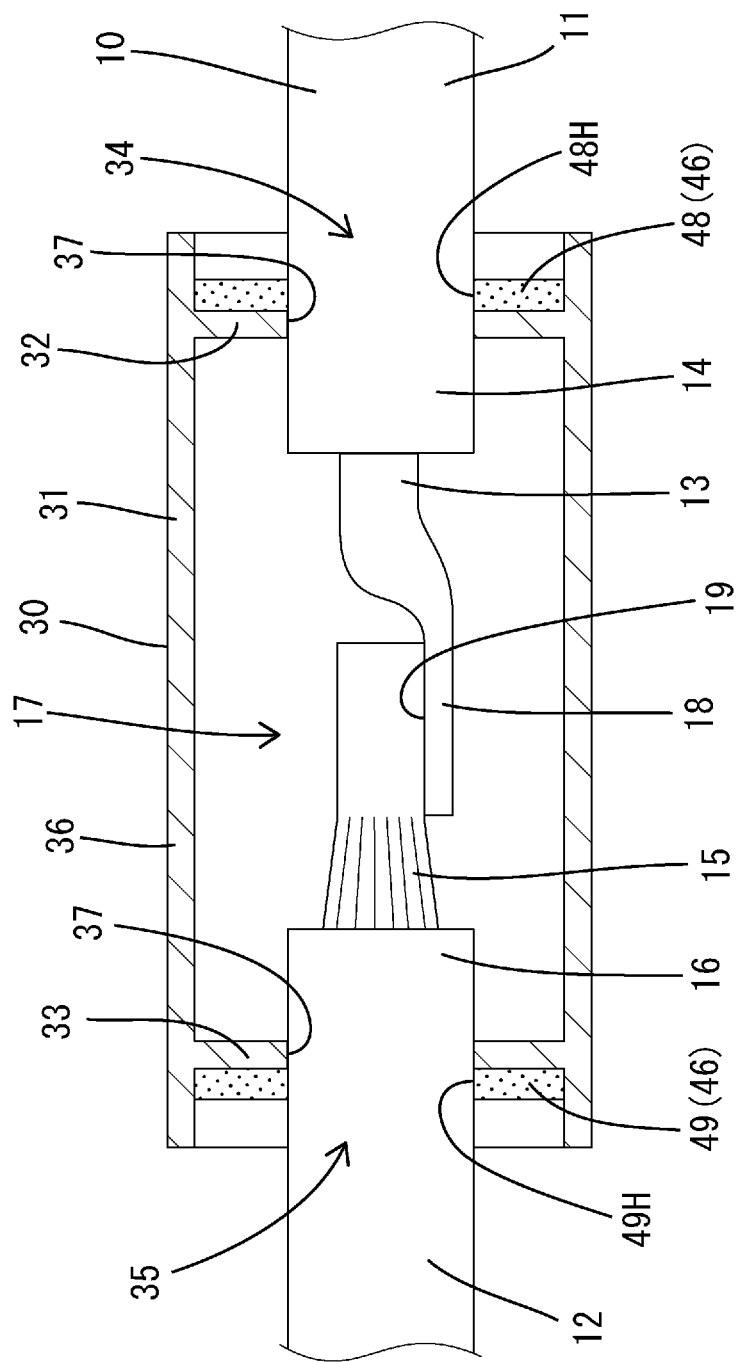
FIG. 3 is a cross-sectional view of the protector, mounted on a connecting portion between the first wire and the second wire.

As shown in FIG. 3, a crushed portion 18 that is crushed into a tubular shape is formed on the exposed terminal portion of the first conductor 13, and one of the flat surfaces of the crushed portion 18 serves as the connecting surface 19 for connection with the second conductor 15. The second conductor 15 is placed on the connecting surface 19 of the first conductor 13 and connected to the first conductor 13, for example, with an ultrasonic bonding machine. This ultrasonic welding provides a metal-to-metal connection between the contact portions of the first conductor 13 and the second conductor 15 so as to establish an electrical connection between the first conductor 13 and the second conductor 15. As shown in FIG. 1, when the conductive wires 10 are inserted in the shield pipe 20, the connecting portions 17 are located at predetermined distances outside of the end face of the shield pipe 20, i.e., disposed within the braided member 21. Note that the connecting portion 17 may be covered with a protective tube (not shown), such as a heat-shrinkable tube.

The wire harness also includes a protector 30 mounted on the connecting potions 17 of the conductive wires 10. The protector 30 is made of synthetic resin and includes a main body 31 that extends between the insulating coating 14 of the first wires 11 and the insulating coating 16 of the second wires 12. The protector 30 also includes first abutment portions 32 that come into abutment with the first wires 11 and second abutment portions 33 that come into abutment with the second wires 12.

As shown in FIG. 3, the main body 31 entirely covers the portion extending between the insulating coating 14 of the first wires 11 and the insulating coating 16 of second wires 12. For each connecting portion, the main body 31 has a first insertion hole 34 through which the first wire 11 is drawn out of the main body 31 and a second insertion hole 35 through which the second wire 12 is drawn out of the main body 31.

Figure 2:
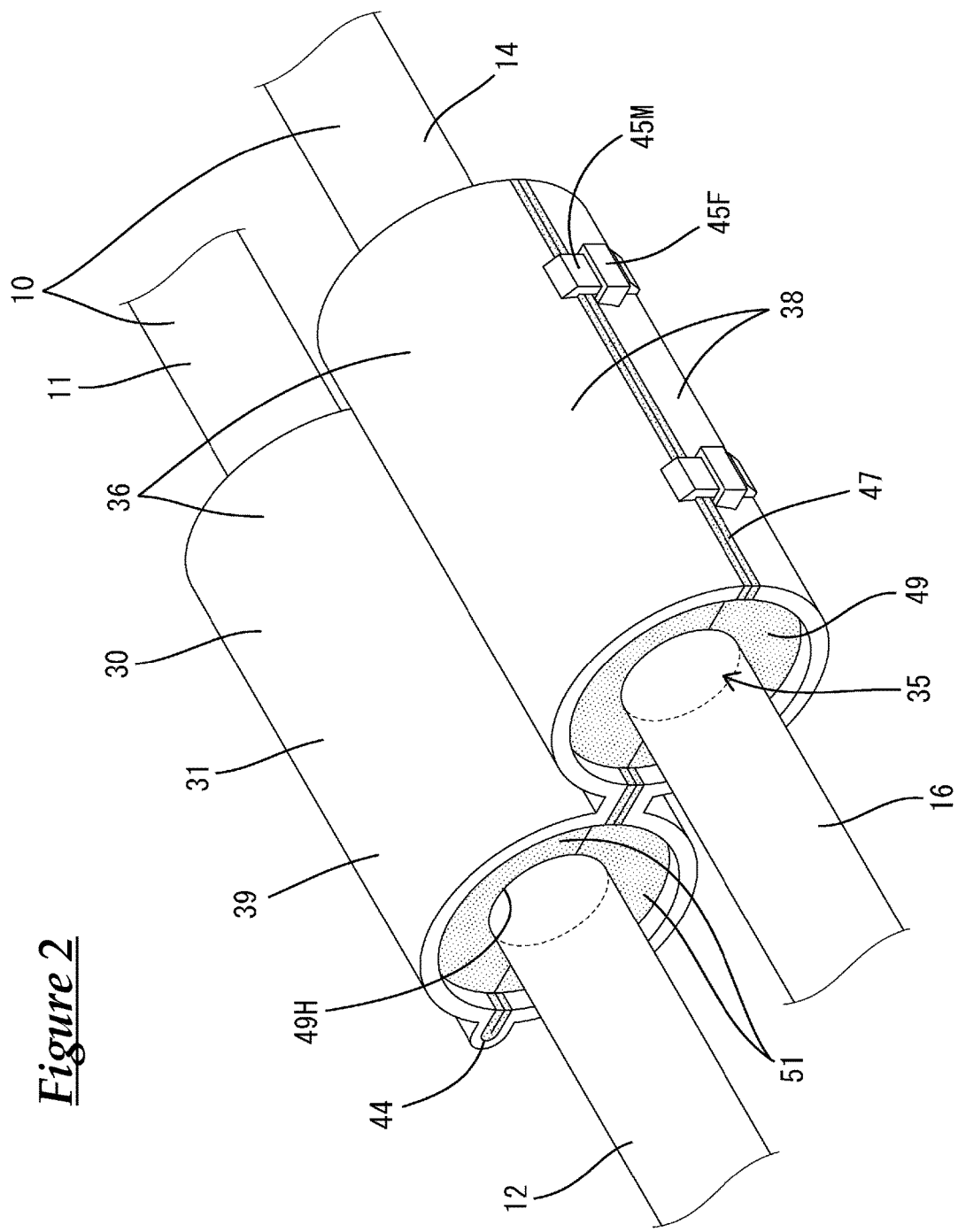
FIG. 2 is a perspective view of the protector mounted on conductive wires.

As shown in FIG. 2, provided on the main bodies 31 are a plurality (two in this embodiment) of tubular portions 36 that individually surround the connecting portions 17 of the conductive wires 10. Each tubular portion 36 has an approximately circular cross section and extends linearly between openings formed on both of the longitudinal ends. The opening on one end of each tubular portion 36 serves as the first insertion hole 34 and the opening on the other end of the tubular portion 36 serves as the second insertion hole 35.

Each of the first abutment portions 32 and the respective second abutment portion 33 are adapted to come into abutment with both sides of the insulating coating 14 of one of the first wires 11 and the insulating coating 16 of one of the second wires 12, in the direction in which the first conductor 13 and the second conductor 15 are placed on each other (in the vertical directions in FIG. 3).

The first abutment portion 32 and the second abutment portion 33 both protrude from the inner circumferential surfaces of the main body 31. The first abutment portion 32 and the second abutment portion 33 are formed as walls that are erected approximately orthogonally from the inner circumferential surfaces of the main body 31 so that the first abutment portion 32 is located at the first insertion hole 34 and the second abutment portion 33 is located at the second insertion hole 35.

The first abutment portion 32 and the second abutment portion 33 are formed in an annular shape that surrounds the entire circumferences of the first wire 11 and the second wire 12, respectively. The protruding end face of the first abutment portion 32 and the protruding end face of the second abutment portion 33 are formed as abutment surfaces 37 that come into abutment with the entire circumferences of the first wire 11 and the second wire 12, respectively. The abutment surfaces 37 define through holes that extend axially and have arcuate shapes that conform to the respective outer shapes of the first wire 11 and the second wire 12.

The main body 31 has a pair of split bodies 38 that can be joined together. The split bodies 38 are adapted to be divided or split in a manner that permits the cylindrical portions 36 of the main body 31 to be opened in an direction orthogonal to the axes of the tubular portions 36.

As shown in FIG. 2, each split body 38 has split-half tubular portions 39 formed by splitting the tubular portions 36 into two halves. Each split-half cylindrical portion 39 has an approximately semicircular cross section. These split-half tubular portions 39 are arranged side by side in their widthwise direction (in the direction transverse to the axial direction). When the pair of split bodies 38 is joined together, the split-half tubular portions 39 of both split bodies 38 are closed together to form the tubular portions 36.

Figure 4:
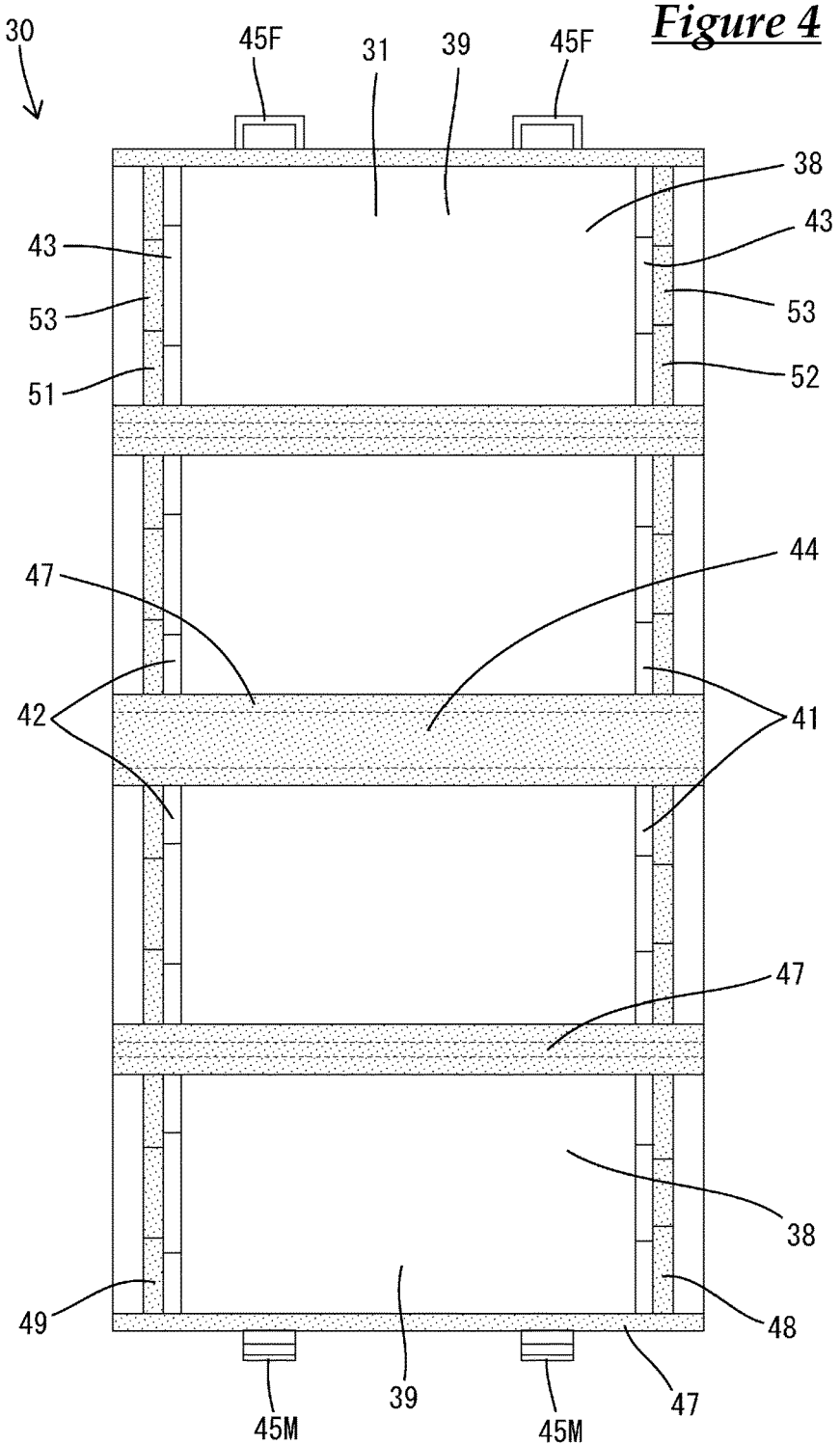
FIG. 4 is a development of the protector, showing the split bodies in their open condition.

As shown in FIG. 4, each split-half cylindrical portion 39 includes a first split-half abutment portion 41, which is a split half of the first abutment portion 32, and a second split-half abutment portion 42, which is a split half of the second abutment portion 33. The first split-half abutment portion 41 and the second split-half abutment portion 42 protrude from the inner circumferential surface of the split-half cylindrical portion 39. Formed on the protruding end faces of the first split-half abutment portion 41 and the second split-half abutment portion 42 are recesses 43 each defining an abutment surface 37. Each recess 43 is sized to match the diameter of the corresponding electrical wire. A first wire 11 and a second wire 12 can be fitted in the recesses 43 without a gap.

The split bodies 38 are connected to each other via a hinge portion 44. The hinge portion 44 connects a widthwise edge of one of the split bodies 38 to a widthwise edge of the other split body 38.

The split bodies 38 are provided with a locking mechanism that locks the split bodies 38 in a joined state. The locking mechanism is provided on the edges of the split bodies 38 opposite to the edges on which the hinge portion 44 are provided. The locking mechanism includes female locking portions 45F provided on one of the split bodies 38 and male locking portions 45M provided on the other one of the split bodies 38 and configured to be inserted into and engage the respective female locking portions 45F.

The split bodies 38 are provided with a sealing structure that seals the interior of the main bodies 31 when the split bodies 38 are joined together. The sealing structure includes: split-surface sealing portions 47 providing sealing between the parting faces that come into abutment with each other when the split bodies 38 are joined together; first wire sealing portions 48 that provide sealing between the circumferential surfaces of the first insertion holes 34 and the outer circumferential surfaces of the first wires 11; and second wire sealing portions 49 that provide sealing between the circumferential surfaces of the second insertion holes 35 and the outer circumferential surfaces of the second wires 12. The split-surface sealing portions 47, the first wire sealing portions 48, and the second wire sealing portions 49 are made of rubber material integrated with the main body 31 by co-injection molding.

As shown in FIG. 4, the split-surface sealing portions 47 are provided as strips along the entire longitudinal parting faces of the split bodies 38. The split-surface sealing portions 47 are provided between the adjacent split-half tubular portions 39 and on both widthwise edges of the split bodies 38.

When the split bodies 38 are joined together, the first wire sealing portions 48 and the second wire sealing portions 49 are brought into intimate contact with the entire circumferences of the first wires 11 and the second wires 12, respectively. The first wire sealing portions 48 and the second wire sealing portions 49 are located outside of the first abutment portions 32 and the second abutment portions 33, respectively, and integrated with the outer wall faces of the first abutment portions 32, the outer wall faces of the second abutment portions 33, respectively, and the inner circumferential surfaces of the main body 31.

Under natural conditions, the first wire sealing portions 48 and the second wire sealing portions 49 protrude further inward (toward the centers of the respective tubular portions 36) than the adjacent first and the second abutment portions 32 and 33, respectively. Formed at the centers of the first wire sealing portions 48 and the second wire sealing portions 49 are first through holes 48H and second through holes 49H each having a completely closed and approximately circular cross section and passing through the tubular portions 36 in the axial direction thereof. The diameter of the first through holes 48H is made smaller than the outer diameter of the first wires 11, and the diameter of the second through holes 49H is made smaller than the outer diameter of the second wires 12.

The first wire sealing portions 48 and the second wire sealing portions 49 are formed in their split halves that are attached to both of the split bodies 38. Recesses 53 that define first through holes 48H or second through holes 49H are formed on the protruding end faces of the first split-half sealing portions 51 and the second split-half sealing portions 52 provided in the split bodies 38.

The following describes an exemplary operation to mount a protector 30 of this embodiment on the connecting portions 17 of conductive wires 10.

First, a pair of split bodies 38 is opened and the connecting portion 17 of each conductive wire 10 is fitted in a split-half cylindrical portion 39 of one of the split bodies 38. That is, the first wires 11 are fitted in the recess portions 53 of the first split-half sealing portions 51 and the recesses 43 of the first abutment portions 32 while the second wires 12 are fitted in the recess portions 53 of the second split-half sealing portions 52 and the recesses 43 of the second abutment portions 33. In this way, approximate halves of the cross sections of the first wires 11 and the second wires 12 are fitted in the recesses 53 and the recesses 43, respectively, thus disposing the connecting portions 17 in the split-half tubular portions 39.

Next, the split bodies 38 are fitted or joined together. By placing one of the split bodies 38 on the other, the recesses 53 of the first split-half sealing portions 51 and the second split-half sealing portions 52 are brought into intimate contact with the outer circumferential surfaces of the first wires 11 and the outer circumferential surfaces of the second wires 12, respectively. Concurrently, the first split-half sealing portions 51 are brought into intimate contact with each other, the second split-half sealing portions 52 are brought into intimate contact with each other, and the split-surface sealing portions 47 are also brought into intimate contact with each other. Moreover, the recesses 43 of the first split-half abutment portions 41 and the second split-half abutment portions 42 are brought into intimate contact with the outer circumferential surfaces of the first wires 11 and the outer circumferential surfaces of the second wires 12, respectively, while the first split-half abutment portions 41 are brought into intimate contact with each other and the second split-half abutment portions 42 are also brought into intimate contact with each other. Then, the locking mechanism is engaged, thus locking the split bodies 38 in the joined state.

When the split bodies 38 are joined together, the split-surface sealing portions 47 are elastically compressed, and come into intimate contact with, each other, and the first wire sealing portions 48 and the second wire sealing portions 49 are elastically compressed, and come into intimate contact with, the first wires 11 and the second wires 12, respectively. This can prevent water from entering the protector 30 through the interfaces between the split surfaces of the split bodies 38 and through the first insertion holes 34 and the second insertion holes 35.

Moreover, the second abutment portions 32 are brought into abutment with the entire circumferences of the second wires 12. In this way, even if either of the second wires 12 deflects, its portion inside the second abutment portion 33 is kept straight without deflection. This in turn prevents forces that would peel the first conductor 13 off the second conductor 15 from acting on the connecting portion 17. Moreover, as the second abutment portions 33 are brought into abutment with the entire circumferences of the second wires 12, even if either conductive wire 10 is rotated circumferentially, the aforementioned displacement of the second wire 12 can be prevented.

Next, the effect of this embodiment configured as described above will be described.

The protector 30 of this embodiment is mounted on connecting portions 17 in each of which the first conductor 13 exposed at a terminal portion of the first wire 11 by stripping the insulating coating 14 therefrom is placed on and connected to the second conductor 15 exposed at a terminal portion of the second wire 12 by stripping the insulating coating 16 therefrom, in a direction transverse to the direction in which the first and second wires 11 and 12 extend. According to this embodiment, the second wire 12 has a higher flexibility than the first wire 11. Moreover, the protector 30 includes: a main body 31 that extends between the insulating coating 14 of the first wires 11 and the insulating coating 16 of the second wires 12; second abutment portions 33 that come into abutment with at least both sides of the insulating coating 16 of the second wires 12 in the direction in which the first conductors 13 and the respective second conductors 15 are placed on each other.

According to this structure, even if either of the second wires 12, which have a relatively high flexibility, is deflected, the connecting portion 17 can be protected as the second abutment portion 33 can prevent deflection in the direction that may otherwise peel the second conductor 15 off the first conductor 13.

Moreover, the main body 31 has a pair of split bodies 38 that can be joined together. The split bodies 38, when joined together, entirely cover the portion extending between the insulating coating 14 of the first wires 11 and the insulating coating 1 of the second wires 12. The main body 31 further includes a sealing structure that, when the split bodies 38 are joined together, provides sealing: between the parting faces of the split bodies 38 that come into abutment with each other; between the circumferential surfaces of the first insertion holes 34, through which the first wires 11 are drawn out of the main body 31, and the outer circumferential surfaces of the first wires 11; and between the circumferential surfaces of the second insertion holes 35, through which the second wires 12 are drawn out of the main body 31, and the outer circumferential surfaces of the second wires 12. According to the structure, as the interior of the main body 31 is sealed in a fluid-tight manner, the connecting portions 17 between the first wires 11 and the second wires 12 can be sealed against water.

Other Embodiments

The present invention is not limited to the embodiments described in the above description and the attached drawings. For example, other embodiments, which will be described below, also fall under the technical scope of the present invention.

In the foregoing embodiment, the protector 30 includes first abutment portions 32 and second abutment portions 33. However, the present invention is not limited to this. For example, the protector may only include the second abutment portions.

In the foregoing embodiment, the protector 30 includes a sealing mechanism. Depending on the operating environment of the wire harness, however, the sealing mechanism may not have to be included.

In the foregoing embodiment, the main body 31 covers the entire portion extending between the insulating coating 14 of the first wires 11 and the insulating coating 16 of the second wires 12. However, the main body does not necessarily cover the entire portion. For example, the main body may also be a straight bar or split-half cylinder extending between the insulating coating of the first wires and the insulating coating of the second wires.

In the foregoing embodiments, although the tubular portions 36 have a tubular or cylindrical shape, the present invention is not limited to such geometry. For example, they may also be square tubes.

In the foregoing embodiments, although the main body 31 includes tubular portions 36 that individually surround the connecting portions 17, the present invention is not limited to this. For example, the main body may also have a single tubular portion (e.g., a flat tube having an approximate oblong shape) that surrounds all the connecting portions.

Although an exemplary locking mechanism is described in the foregoing embodiment, the present invention is not limited to this. The locking mechanism may also be modified as required or replaced with any other suitable type of locking mechanism.

In the foregoing embodiment, although a pair of split bodies 38 is connected to each other via a hinge portion 44, the present invention is not limited to this. For example, a hinge portion may not be used to connect the split bodies.

In the foregoing embodiment, the second abutment portions 33 come into abutment with the entire circumferences of the second wires 12. The present invention is not limited to this. For example, any other arrangement may suffice as long as the second abutment portions come into abutment with at least both sides of the second wires in the direction in which the first conductors and the respective second conductors are placed on each other.

In the foregoing embodiments, although each first conductor 13 is made of a single metal rod (core) and each second conductor 15 is made of a stranded plurality of metal elemental wires, the present invention is not limited to this. For example, each first conductor may be made of a metal pipe and/or each second conductor may also be a braided wire formed by weaving a large number of elemental metal wires.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

11 First wire
12 Second wire
13 First conductor (Conductor)
14 Insulating coating
15 Second conductor (Conductor)
16 Insulating coating
17 Connecting portion
30 Protector
31 Main body
33 Second abutment portion (Abutment portion)
34 First insertion hole
35 Second insertion hole
38 Split body

What is claimed is:

1. A protector to be mounted on a connecting portion in which a conductor exposed at a terminal portion of a first wire by stripping insulating coating therefrom is placed on and connected to a conductor exposed at a terminal portion of a second wire by stripping insulating coating therefrom, in a direction transverse to a direction in which the first wire and the second wire extend, the second wire having a higher flexibility than the first wire, the protector comprising:
   a main body including a pair of split bodies that join together to form a tubular portion, the main body extends between the insulating coating of the first wire and the insulating coating of the second wire;
   an abutment portion including a protruding end face that forms a circumferential surface of an insertion hole, the abutment portion extends perpendicularly from an inner circumferential surface of the main body and comes into abutment with at least both sides of the insulating coating of the second wire in the direction in which the conductor of the first wire and the conductor of the second wire are placed on each other; and
   a wire sealing portion being adjacent the abutment portion and extending perpendicularly from the inner circumferential surface of the main body, wherein the abutment portion and the wire sealing portion are brought into contact with the sides of the insulating coating of the second wire to seal a space around the connecting portion.

2. The protector according to claim 1,
   wherein the split bodies, when joined together, cover an entire portion extending between the insulating coating of the first wire and the insulating coating of the second wire,
   wherein the split bodies include a sealing structure that includes the wire sealing portion that, when the split bodies are joined together, provides sealing: between parting faces of the split bodies that come into abutment with each other; between the circumferential surface of a first insertion hole through which the first wire is drawn out of the main body and the outer circumferential surface of the first wire; and between the circumferential surface of a second insertion hole through which the second wire is drawn out of the main body and the outer circumferential surface of the second wire.

3. A wire harness comprising:
   a first wire;
   a second wire having a higher flexibility than the first wire;
   at least one connecting portion in each of which a conductor exposed at a terminal portion of a first wire by stripping insulating coating therefrom is placed on and connected to a conductor exposed at a terminal portion of a second wire by stripping insulating coating therefrom, in a direction transverse to a direction in which the first wire and the second wire extend; and
   the protector according to claim 1 being mounted on the at least one connecting portion.

* * * * *